UNITED STATES PATENT OFFICE.

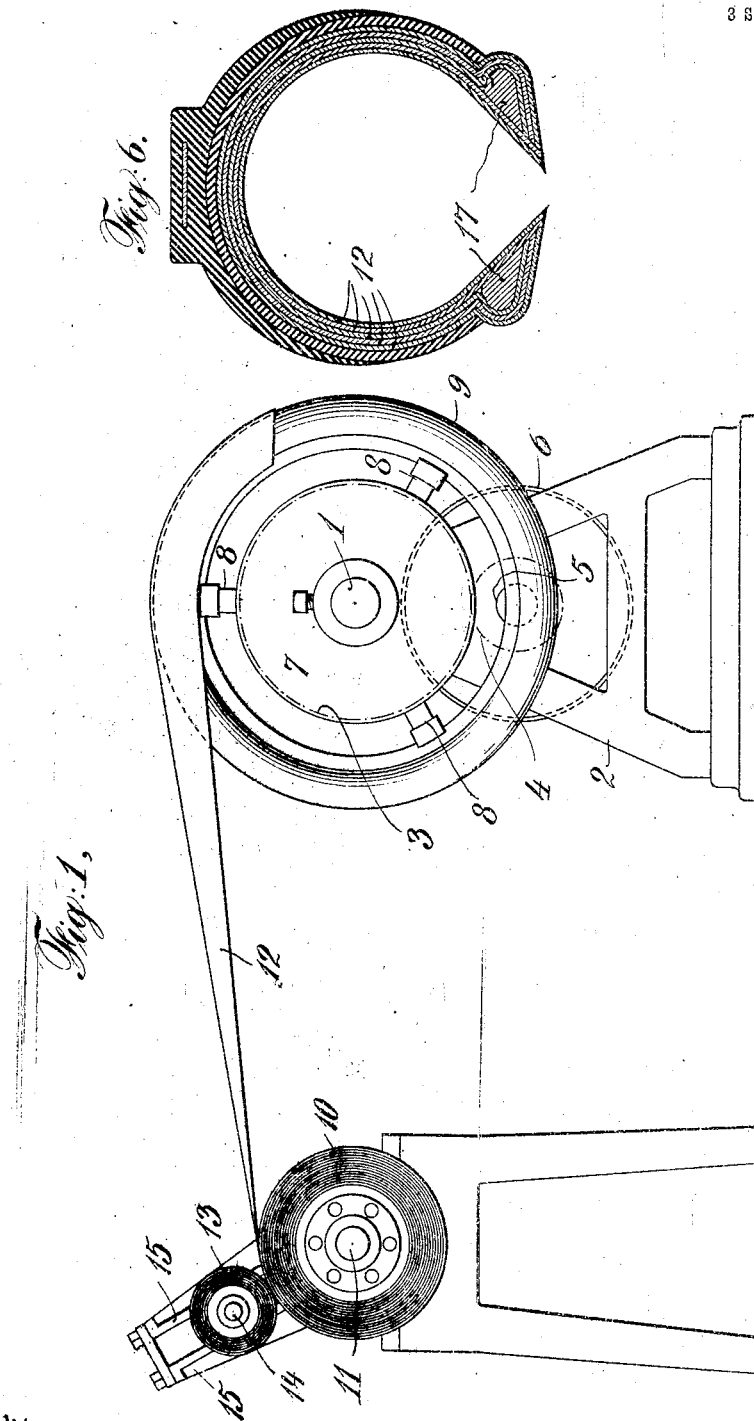

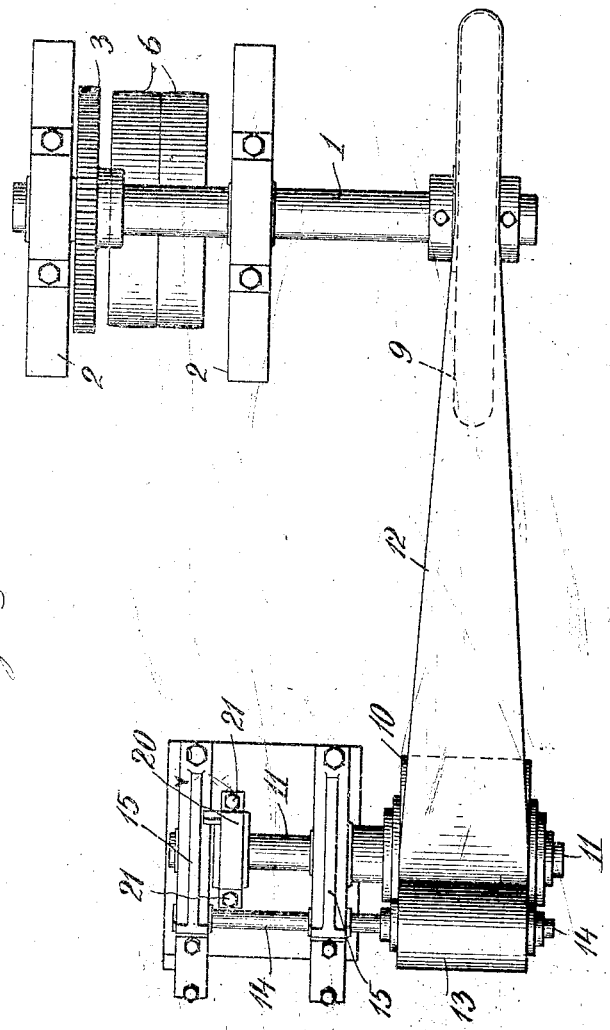

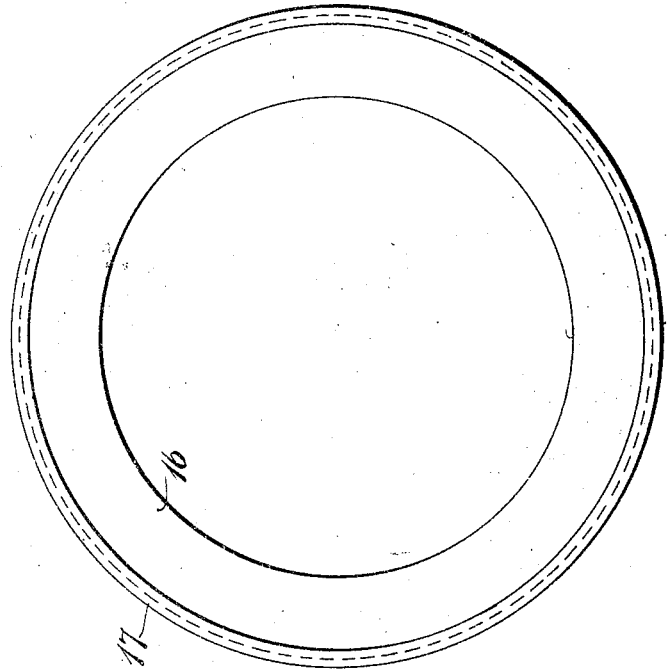
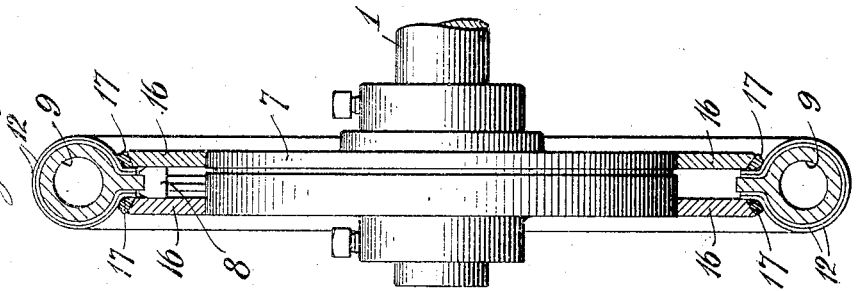
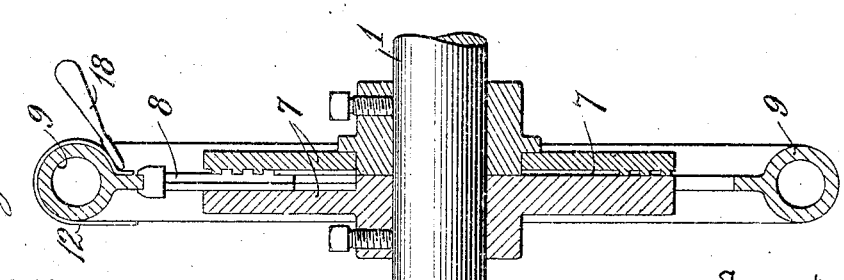

THOMAS J. WHALEN, OF NEW BRUNSWICK, NEW JERSEY, ASSIGNOR, BY MESNE ASSIGNMENTS, TO HARRY M. MARBLE, OF NEWARK, NEW JERSEY.

TIRE-MAKING MACHINE.

1,045,346.   Specification of Letters Patent.   Patented Nov. 26, 1912.

Original applications filed September 15, 1910, Serial No. 582,186, and October 6, 1910, Serial No. 585,623. Divided and this application filed November 2, 1910. Serial No. 590,245.

*To all whom it may concern:*

Be it known that I, THOMAS J. WHALEN, a citizen of the United States of America, and a resident of New Brunswick, in the county of Middlesex and State of New Jersey, have invented certain new and useful Tire-Making Machines, of which the following is a specification.

My invention relates to machines for making pneumatic tires, more especially for making shoes of clencher and "quick-detachable" types of pneumatic tires, and comprises means for applying beads during the making of such shoes.

The object of my invention is to facilitate the application of beads to partly-formed tire shoes.

I will now proceed to describe my invention with reference to the accompanying drawings, in which one construction of machine embodying my invention is illustrated, and will then point out the novel features in claims.

In said drawings: Figure 1 shows a side elevation of my improved tire making machine. Fig. 2 shows a top view thereof. Fig. 3 shows a transverse section through the chuck and core of said machine. Fig. 4 is a view similar to Fig. 3, except that the chuck is not shown in section, and except that the forms for applying the beads are shown in place on the chuck. Fig. 5 is a face view of one of the bead-applying forms, showing a bead in place thereon ready to be applied to the partly formed shoe. Fig. 6 shows a cross section of the completed tire shoe.

In the drawings, 1 designates the main revoluble shaft of the machine, 2 a frame in which said shaft is revolubly mounted, 3 a gear wheel on said shaft, 4 a pinion intermeshing with said gear 3 and mounted on a shaft 5, and 6, 6, belt pulleys, one tight and one loose, on shaft 5, for applying power to drive the same.

7 designates a chuck, on shaft 1, designed to receive a core on which the tire shoe is to be formed. 8, 8, designate the jaws or arms of said chuck. 9 designates a ring-core, upon which the tire shoe is to be formed, mounted on said chuck.

10 designates a supply roll from which a strip of rubber-saturated fabric is drawn, during the making of the shoe, and 11 designates the shaft on which said roll is mounted.

12 designates the fabric strip.

13 designates a wrapper roll, upon which a strip of fabric, interwound with the layers of strip 12 on roll 10, is wound up as fabric 12 is drawn from roll 10.

14 designates a shaft on which wrapper roll 13 is mounted, and 15, 15 designate guides in which shaft 14 may move radially to or from the supply roll 10.

Wrapper roll 13 is driven by frictional contact with the roll of fabric on roll 10. On shaft 11 of roll 10 is a friction bearing box, 20, which may be set up by means of screws 21, to regulate the tension under which the fabric is drawn from roll 10.

For applying beads to the two sides of the shoe, during the making of the shoe, I preferably employ annular forms 16, adapted to fit over some member of the machine, for example, the chuck 7, whereby they may be centered with respect to the shoe in process of construction. Before placing these forms against a partly formed shoe, a previously-formed bead-ring, 17, of suitable material, is mounted on the periphery of each form 16; and it is then easy to transfer such bead-ring to the partly-formed shoe, by mounting the form on the chuck, pressing it home, and then pressing the bead-ring against the partly-formed shoe, with a suitable tool, while the core 9 rotates, so causing the bead-ring to adhere to the shoe; after which the form 16 may be removed.

Heretofore, in machines for forming tire-shoes, the beads have usually been applied from continuous bead-strips, fed to the shoe by means of carefully-adjusted feeding devices. The application of the beads in this way is a somewhat delicate operation. Applying the beads in the manner herein described, is a much simpler operation, which may be performed much more rapidly, and the beads, when applied, are applied in precisely the proper place, and are truly concentric. It is a very easy matter to form the bead-rings before placing them on the forms, and such rings may be made by unskilled labor.

In forming tire shoes by means of the machine shown and described herein, the method of operation is as follows: The ring-core, 9, is first coated with rubber cement, and the end of the fabric-strip, 12, is drawn from roll 10 and applied to the ring-core, and the ring-core is then set in rotation, so winding the fabric-strip upon it; and as the fabric is so wound on the core, the workmen, with hand tools, termed spades, press the fabric in against the under side of the ring-core. The tension with which the fabric 12 is drawn from the roll 10 may be relied upon to insure tight winding of the fabric on the core, or, if necessary, pressure rollers, applied by hand or otherwise, may be used for rolling down the fabric as the winding proceeds. After a suitable number of layers of the fabric have been wound upon the core in this manner (two layers is usually considered sufficient), the bead-rings 17 are applied in the manner previously described, and the winding of the fabric is continued, the fabric being now caused to cover the beads. The fabric is rolled down over the beads by suitable grooved bead-perfecting rolls, which may be in hand-tools operated by the workmen, or may be mounted and actuated as described in my prior applications for patents, Sr. Nos. 582,186 and 585,623, of each of which applications this present application is a division. After a sufficient number of these outer layers of fabric have been applied, the strip of fabric is cut, its end pressed down tightly on the layer of fabric beneath, and the edges of the fabric are trimmed by applying suitable trimming knives just beneath the bead; and these trimming knives may be in hand tools operated by the workmen, or may be mounted and actuated as described in my said prior applications. One or more layers of gum are then applied to the outer portion of the shoe to form what is termed the "padding." This padding usually covers the entire outer surface of the carcass as so far formed, from the bead on one side thereof to the bead on the other side thereof. Such layer or layers of gum may be applied by hand, or, and preferably, may be applied by substituting in the machine, for the fabric supply roll 12, another supply roll carrying a gum strip. The gum is wound upon the partly formed shoe in the same way as is the fabric, and, usually, is pressed down tightly as so wound, by rollers held by hand or otherwise against the shoe. Another strip of gum, somewhat narrower, and, usually, considerably thicker than the strip for forming the padding, is then applied to what is to be the tread surface of the shoe, in a similar manner. The construction of the shoe is then complete, and it is ready for the curing, which latter is done in the ordinary manner.

18, in Fig. 3, designates one of the spades, i. e., the hand tools used in pressing the fabric against the core.

What I claim is:—

1. A tire-forming machine comprising in combination a rotatable core, upon which the tire may be formed, a chuck for holding said core, and bead-applying means comprising a circular form adapted to hold a circular bead-ring and to be placed adjacent to the core, said form and chuck provided with means for centering the form with respect to the core.

2. A tire-forming machine comprising in combination a rotatable chuck, a core held thereby and upon which the tire may be formed, said chuck provided with a cylindrical shoulder, and a bead-applying form adapted to fit over said shoulder in a position in which it is adjacent to said core, said form adapted to hold a circular bead-ring.

In testimony whereof I have signed this specification in the presence of two subscribing witnesses.

THOMAS J. WHALEN.

Witnesses:
 H. M. MARBLE,
 D. A. DAVIES.